Patented May 27, 1947

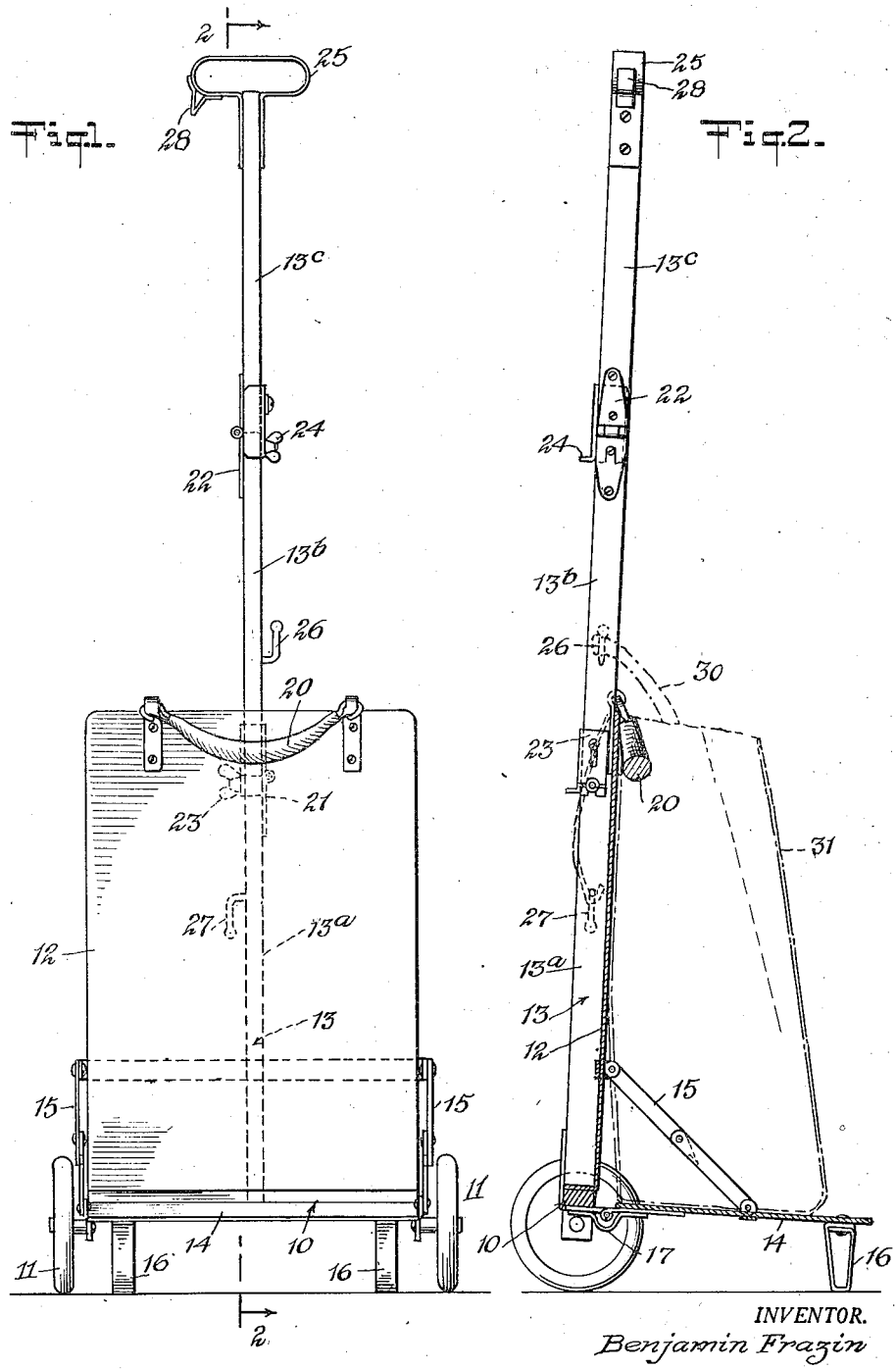

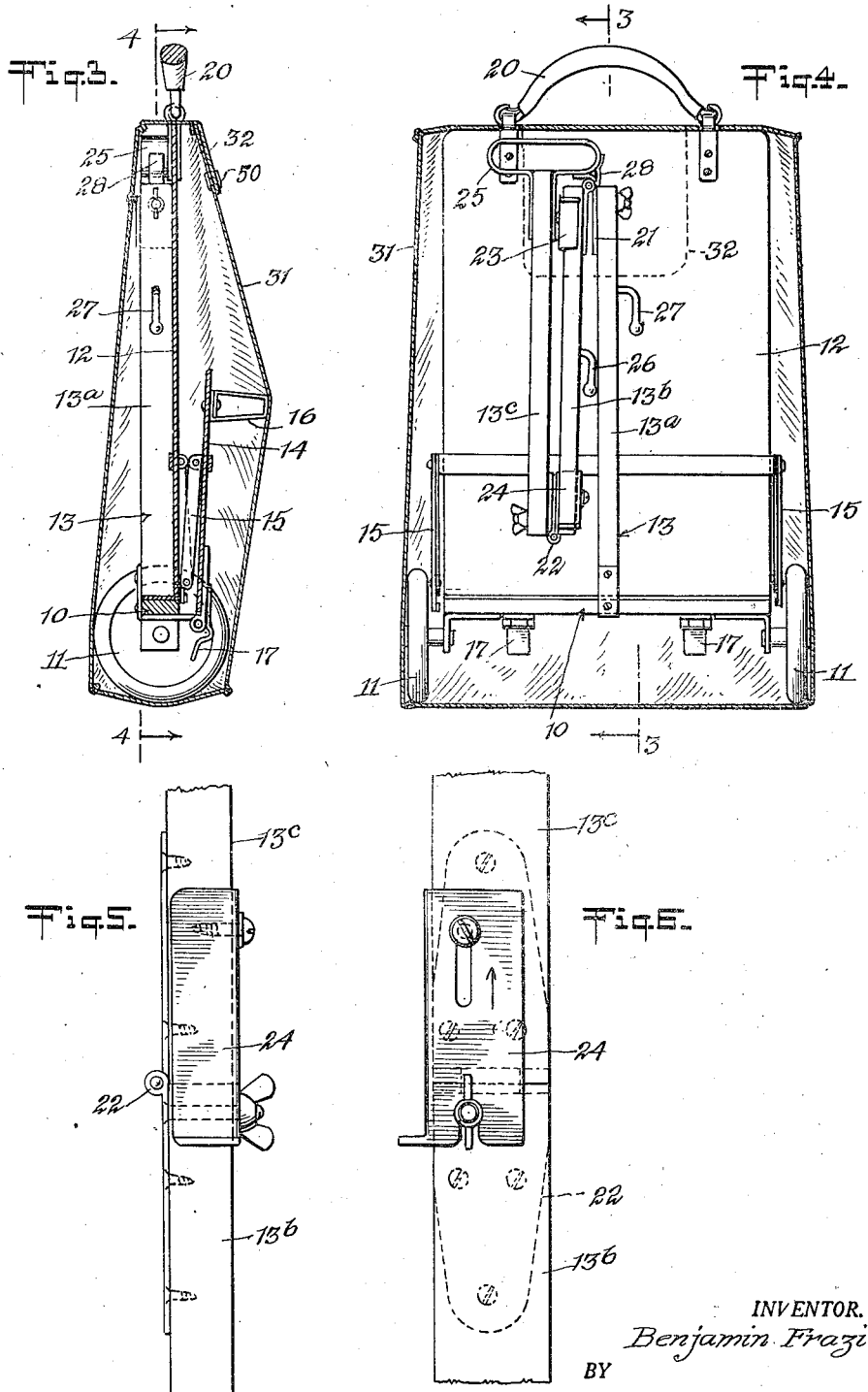

2,421,322

UNITED STATES PATENT OFFICE 2,421,322

SHOPPING CART

Benjamin Frazin, New York, N. Y.

Application December 11, 1945, Serial No. 634,226

1 Claim. (Cl. 280—36)

1

The present invention relates to shopping carts and more particularly to portable, collapsible shopping carts.

The principal object of the invention is the provision of a shopping cart of the character described which is of extremely simple and light construction and which is collapsible for carrying and storage purposes. This cart is provided with a bag to hold the different articles which are purchased and carried in the cart, and the bag is also adapted to enclose the entire cart when the cart is collapsed. A convenient carrying handle extends through an opening in the bag when the cart is carried therein.

A preferred embodiment of this invention is shown in the accompanying drawing in which—

Fig. 1 is a front view of the device fully set up and ready for use;

Fig. 2 is a longitudinal section on the line 2—2 of Fig. 1 showing by means of dot and dash lines how the carrying bag is supported by the cart;

Fig. 3 is a section on the line 3—3 of Fig. 4 showing the cart fully collapsed and enclosed within the bag;

Fig. 4 is a section on the line 4—4 of Fig. 3 showing the cart in the same collapsed position;

Fig. 5 is a rear view of one of the clamping devices used to clamp the collapsible handle in extended position; and Fig. 6 is a side view of the same clamping device.

The shopping cart shown in the drawing is provided with a frame 10 mounted on a pair of wheels 11. Supported by the frame 10 is a back rest 12 and also supported by the frame is a foldable handle 13. Hingedly connected to the frame 10 is a foldable platform or support 14 which is braced by means of a pair of folding brackets 15 connected at one end to said platform and at the other end to the back rest 12. A pair of posts 16 are affixed to the bottom of the platform 14 for the purpose of providing, in combination with the wheels 11, a four point support for the shopping cart to enable the cart to stand upright without falling over. A pair of brackets 17 affixed to the platform 14 at its hinged edge assists the brackets 15 in preventing the platform 14 from pivoting downwardly beyond a predetermined plane. A handle 20 is affixed to the upper part of the back rest 12. Said handle 20 is intended for carrying the cart when collapsed, and also used when boarding a trolley or bus, first collapsing the handle 13.

The handle 13 comprises three elongated members 13a, 13b and 13c, respectively, connected to

2 each other by means of hinges 21 and 22. Clamp 23 is used to clamp the members 13a and 13b in extended position and clamp 24 is used to clamp the members 13b and 13c in extended position. A hand grip or handle 25 is affixed to the top of the member 13c and it is this hand grip or handle that is held when the cart is being pulled or pushed on shopping trips. A hook 26 is affixed to the member 13b for the purpose of engaging the loop or handle 30 of bag 31 when the bag is carried on the platform 14. A second hook 27 is provided on the member 13a to engage the handle 30 of the bag 31, when the cart is loaded, while ascending or descending a car or bus. Bag 31 is removed from hook 26 when handle 13 is collapsed and placed, as aforesaid, on hook 27. To fold or collapse the cart for carrying or storage purposes, the clamps 24 and 23 are released and the handle 13 folded in the manner shown in Fig. 4. In this folded position a tension member or clamp 28 engages the hinge 21 and holds the handle 13 in said folded position. The platform 14 is also pivoted upwardly and against the back rest 12 to the position shown in Fig. 3. The assembled cart is now inserted into the bag 31 as shown in Figs. 3 and 4. The top of the bag is provided with the opening through which the cart is thus placed in the bag. A flap 32 on said bag is adapted to close or partly close said opening. It will be noted in Fig. 3 that the flap is brought under the handle 20 in order to close the bag thereby leaving the handle 20 in exposed position. It is thus possible to carry the folded cart enclosed in the bag by means of the handle 20. Flap 32 is provided with a fastening member 50 by which the flap may be fastened to the bag 31 after it has been brought under handle 20, thereby locking the bag about all of the parts which are enclosed therein.

It will be understood that what has above been described is but a preferred embodiment of the invention and many variations and modifications may be incorporated therein without departing from the basic principles of the invention. For example, the clamp shown in Figs. 5 and 6 is but one form of many clamps which may be used for the purpose described. A pair of posts 16 perform the function of supporting the cart in association with the wheels 11. It will be understood that a single post, centrally located, would perform the same function perhaps equally well.

I claim:

A portable shopping cart comprising a pair of wheels, a frame mounted on said pair of wheels, a back rest mounted on said frame, a foldable pulling handle connected to said frame and said back rest, a foldable platform connected to said frame, a carrying handle on said back rest, a bag supported by said platform, a loop on said bag, a hook on said pulling handle, said loop being adapted to engage the hook to prevent the bag from falling off the platform, said bag being adapted to accommodate all of the other parts of the cart including the foldable parts thereof when they are in folded position, said bag having an opening through which the carrying handle may extend when all of the other parts of the shopping cart are enclosed within said bag, and a closing member for said opening, said closing member comprising a flap which extends under said carrying handle, leaving said carrying handle exposed for carrying purposes, and fastening means for fastening said flap to the bag to prevent the bag from falling off the rest of the cart when the cart is carried.

BENJAMIN FRAZIN.

REFERENCES CITED

The following references are of record in the file of this patent:

UNITED STATES PATENTS

| Number | Name | Date |
|---|---|---|
| 577,432 | Kratzet | Feb. 23, 1897 |
| 1,242,418 | Booth | Oct. 9, 1917 |
| 1,718,962 | Kimbal | July 2, 1929 |
| 2,313,884 | Matton | Mar. 16, 1943 |
| 1,751,902 | Brown | Mar. 25, 1930 |
| 2,395,275 | Jackson | Feb. 19, 1946 |